219-121

2/11/86 OR 4,570,048

United States Patent [19]

Poole

[11] Patent Number: 4,570,048

[45] Date of Patent: Feb. 11, 1986

[54] PLASMA JET TORCH HAVING GAS VORTEX IN ITS NOZZLE FOR ARC CONSTRICTION

[75] Inventor: John W. Poole, Concord, N.H.

[73] Assignee: Plasma Materials, Inc., Manchester, N.H.

[21] Appl. No.: 626,454

[22] Filed: Jun. 29, 1984

[51] Int. Cl.⁴ .................................................. B23K 9/00

[52] U.S. Cl. ........................ 219/121 PP; 219/121 PR; 219/121 PM; 219/121 PQ

[58] Field of Search .................. 219/121 PM, 121 PP, 219/121 PQ, 121 P, 121 PR; 313/231.31, 231.41, 231.51

[56] References Cited

U.S. PATENT DOCUMENTS

| | | | |
|---|---|---|---|
| 3,614,376 | 10/1971 | Hachioji-shi et al. | 219/121 PP |
| 3,641,308 | 2/1972 | Couch, Jr. et al. | 219/121 PP |
| 3,825,718 | 7/1974 | Mosiashvili et al. | 219/121 PP |
| 4,059,743 | 11/1977 | Esbian et al. | 219/121 PP |
| 4,311,897 | 1/1982 | Yerushalmy | 219/121 PM |

*Primary Examiner*—M. H. Paschall

*Attorney, Agent, or Firm*—Cesari and McKenna

[57] ABSTRACT

An electric arc or plasma jet torch or heater has water-cooled electrode structures and a working gas injection arrangement which produce efficiently a very stable arc of maximum length at operating currents ranging from 20 amps to more than 400 amps so that the same torch can be used to satisfy a wide range of heating requirements.

12 Claims, 7 Drawing Figures

| | A | B | C | D | E | F | G |
|---|---|---|---|---|---|---|---|
| AMPS. | 50 | 62 | 75 | 100 | 100 | 125 | 151 |
| VOLTS | 264 | 256 | 252 | 260 | 245 | 243 | 249 |
| KW | 13.2 | 15.87 | 18.9 | 26.0 | 24.5 | 30.38 | 37.6 |
| $N_2$-(SCFH) | 198 | 198 | 198 | 198 | 345 | 345 | 345 |
| $N_2$-(LB/SEC) | .0040 | .0040 | .0040 | .0040 | .0070 | .0070 | .0070 |
| EFFICIENCY | .818 | .808 | .792 | .789 | .776 | .752 | .746 |
| ENTHALPY BTU/LB. | 2550 | 3028 | 3532 | 4845 | 2577 | 3098 | 3803 |
| TEMP (°K) | 4452 | 4888 | 5278 | 6081 | 4479 | 4946 | 5466 |

| | H | I | J | K | L | M | N |
|---|---|---|---|---|---|---|---|
| AMPS | 100 | 151 | 175 | 200 | 225 | 150 | 200 |
| VOLTS | 256 | 248 | 253 | 261 | 266 | 260 | 266 |
| KW | 25.6 | 37.45 | 44.28 | 52.2 | 59.58 | 39.0 | 53.2 |
| $N_2$-(SCFH) | 507 | 507 | 507 | 507 | 507 | 709 | 709 |
| $N_2$-(LB/SEC) | .0103 | .0103 | .0103 | .0103 | .0103 | .0143 | .0143 |
| EFFICIENCY | .757 | .737 | .730 | .735 | .729 | .732 | .728 |
| ENTHALPY (BTU/LB. | 1787 | 2543 | 2981 | 3538 | 4024 | 1882 | 2553 |
| TEMP (°K) | 3548 | 4445 | 4848 | 5283 | 5610 | 3680 | 4454 |

| | O | P | Q | R | S | T | U |
|---|---|---|---|---|---|---|---|
| AMPS | 225 | 250 | 200 | 226 | 251 | 265 | 275 |
| VOLTS | 274 | 283 | 274 | 282 | 293 | 300 | 306 |
| KW | 61.65 | 70.75 | 54.8 | 63.73 | 73.54 | 79.5 | 84.15 |
| $N_2$-(SCFH) | 709 | 709 | 856 | 856 | 856 | 856 | 856 |
| $N_2$-(LB/SEC) | .0143 | .0143 | .0173 | .0173 | .0173 | .0173 | .0173 |
| EFFICIENCY | .734 | .734 | .728 | .734 | .740 | .743 | .751 |
| ENTHALPY (BTU/LB. | 2982 | 3426 | 2179 | 2556 | 2975 | 3227 | 3451 |
| TEMP (°K) | 4849 | 5201 | 4053 | 4457 | 4843 | 5049 | 5220 |

FIG. 4

TORCH HEAT BALANCE

| RUN NO. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| CURRENT | 202 | 251 | 301 | 303 | 250 | 200 | 200 | 250 | 301 | 325 | 350 | 351 | 150 | 101 | 150 |
| VOLTAGE | 397 | 438 | 460 | 482 | 469 | 437 | 462 | 484 | 496 | 500 | 509 | 511 | 398 | 397 | 483 |
| KW | 80.2 | 109.9 | 138.5 | 146.0 | 117.2 | 87.4 | 92.4 | 121 | 149.3 | 162.5 | 178.2 | 179.4 | 59.7 | 40.1 | 24.1 |
| GAS METER | 450 | 450 | 450 | 525 | 525 | 525 | 600 | 600 | 600 | 600 | 600 | 610 | 525 | 525 | 520 |
| GAS PRESS. | 109 | 109 | 109 | 105 | 105 | 105 | 102 | 102 | 102 | 102 | 102 | 105 | 111 | 111 | 111 |
| WATER FLOW | 12.2 | 12.2 | 12.2 | 12.2 | 12.2 | 12.2 | 12.2 | 12.2 | 12.2 | 12.2 | 12.2 | 12.2 | 12.2 | 12.2 | 12.2 |
| T OUT | 53.6 | 56.8 | 60.1 | 61.1 | 57.4 | 54.0 | 54.1 | 57.7 | 61.7 | 63.7 | 66.1 | 66.2 | 51.5 | 48.8 | 46.5 |
| T IN | 44.0 | 44.0 | 44.0 | 44.0 | 44.0 | 44.0 | 44.0 | 44.0 | 44.0 | 44.0 | 44.0 | 44.0 | 44.0 | 44.0 | 44.0 |
| BTU/SEC IN | 75.8 | 103.9 | 130.8 | 138.0 | 110.8 | 82.6 | 87.3 | 114.3 | 141.1 | 153.6 | 168.4 | 169.5 | 56.4 | 37.9 | 22.8 |
| COOLING LOSS | 16.3 | 21.7 | 27.3 | 29.0 | 22.7 | 16.9 | 17.1 | 23.2 | 30.0 | 33.4 | 37.4 | 37.6 | 12.6 | 8.1 | 4.2 |
| NET TO GAS | 59.5 | 82.2 | 103.5 | 108.9 | 88.1 | 65.6 | 70.2 | 91.1 | 111.1 | 120.2 | 130.9 | 131.8 | 43.8 | 29.7 | 18.6 |
| $N_2$-(SCFH) | 1325 | 1325 | 1325 | 1521 | 1521 | 1521 | 1717 | 1717 | 1717 | 1717 | 1717 | 1768 | 1559 | 1559 | 1544 |
| $N_2$-(LB/SEC) | .025 | .025 | .025 | .029 | .029 | .029 | .033 | .033 | .033 | .033 | .033 | .034 | .030 | .030 | .029 |
| EFFICIENCY | .785 | .791 | .791 | .790 | .795 | .795 | .804 | .797 | .787 | .782 | .777 | .778 | .776 | .785 | .814 |
| BTU/LB. | 2350 | 3245 | 4088 | 3749 | 3030 | 2258 | 2140 | 2778 | 3386 | 3663 | 3990 | 3904 | 1470 | 998 | 630 |

FIG. 6

TORCH HEAT BALANCE

| RUN NO. | 16 | 17 | 18 | 19 | 20 | 21 |
|---|---|---|---|---|---|---|
| CURRENT | 327 | 350 | 374 | 375 | 394 | 104 |
| VOLTAGE | 493 | 497 | 500 | 514 | 518 | 419 |
| KW | 161.2 | 173.9 | 187.0 | 192.7 | 204.1 | 43.6 |
| GAS METER | 525 | 525 | 525 | 596 | 596 | 604 |
| GAS PRESS. | 105 | 105 | 105 | 102 | 102 | 101 |
| WATER FLOW | 12.2 | 12.2 | 12.2 | 12.2 | 12.2 | 12.2 |
| T OUT | 63.55 | 65.6 | 67.8 | 68.8 | 70.5 | 49.2 |
| T IN | 44.1 | 44.1 | 44.1 | 44.1 | 44.1 | 44.1 |
| BTU/SEC IN | 152.3 | 164.4 | 176.7 | 182.1 | 192.8 | 41.2 |
| COOLING LOSS | 33.0 | 36.4 | 40.2 | 41.9 | 44.7 | 8.7 |
| NET TO GAS | 119.3 | 127.9 | 136.5 | 140.2 | 148.1 | 32.4 |
| $N_2$-(SCFH) | 1521 | 1521 | 1521 | 1705 | 1705 | 1721 |
| $N_2$-(LB/SEC) | .029 | .029 | .029 | .033 | .033 | .033 |
| EFFICIENCY | .783 | .778 | .773 | .770 | .768 | .788 |
| BTU/LB. | 4106 | 4401 | 4697 | 4305 | 4545 | 986 |

FIG.6 CONT.

PLASMA JET TORCH HAVING GAS VORTEX IN ITS NOZZLE FOR ARC CONSTRICTION

This invention relates to a plasma jet torch or heater. It relates more particularly to an improved torch of this type which operates reliably and efficiently over a wide range of operating conditions.

BACKGROUND OF THE INVENTION

The present type torch uses an electric arc struck between a pair of electrodes to heat a working gas. The gas extends the arc and it is heated by the arc such that it becomes ionized and disassociated to form a plasma. Such torches can usually operate in a so-called transferred mode wherein the arc and plasma jet extend from a nozzle to the workpiece being heated and in some cases the torches operate in a so-called non-transferred mode in which case the arc impinges the wall of the nozzle which functions as an anode and only the plasma effluent is projected as a jet beyond the nozzle toward the workpiece. The basic operation of torches of this type are described in detail in U.S. Pat. No. 2,960,594. Generally, they are used in applications requiring intense heat such as in continuous casting, melting, sintering, and like processes.

Over the years since the above basic patent issued, various improvements have been made to plasma jet torches to increase their power, efficiency and the operating life of their parts. For example, U.S. Pat. No. 3,027,446 describes an electric arc torch in which the plasma-forming gas is introduced into the torch through a relatively few tangentially disposed small holes to create a vortex which surrounds the electric arc. This gas swirl stabilizes the arc and cools the wall of the nozzle through which the plasma projects. U.S. Pat. No. 3,118,046 discloses a plasma jet torch whose cathode element is located at the very bottom of a well to lengthen and stabilize the arc, while minimizing erosion of that element due to reaction with the working gas. U.S. Pat. No. 3,297,899 discloses a similar torch having a wasp-waisted or constricted anode nozzle through which the arc passes in order to maintain a relatively high working gas pressure in the torch so that the torch can deliver a jet flame of high power, but low pressure at a reasonable current level.

Invariably, such torches have certain requirements with respect to the electric power supplied to the torch and the flow rate through the torch of the plasma-forming gas if the torch is to operate in a reliable and stable manner. If the power to the torch is too low, there will be insufficient ionization of the gas to form a useful plasma. If the gas velocity in the arc pathway is insufficient, the arc will be unstable and flashback or premature arcing to the electrode wall will occur. On the other hand, the upper limit of the power that may be supplied to the torch depends primarily upon the structural limitations of the torch components. For example, if there is too much power to the torch, pitting and even melting of its electrodes can result and, if the gas velocity becomes too high, erosion of the nozzle electrode can occur or the arc may be blown out. Present day plasma jet torches including those described in the aforesaid patents are disadvantaged in that their regions of stable operation within the aforesaid limits are rather small. Apparently, the arc wanders somewhat in its passageway due to small moments of its electron emission site and to small variations or pulsations in the working gas vortex that supports the arc. Resultantly, particularly at high power levels, arc fingers tend to strike prematurely to the electrode walls causing unstable operation and temperature variations in the plasma effluent, as well as electrode pitting and erosion of the electrodes. Power delivered to the plasma developed by the torch is the power supplied less electrode and radiation losses which appear as heating of the cooling water supplied to the torch. Consequently, the realized power of a given torch can only be varied over a relatively small range. As a result, arc torches have to be designed specifically for operation in a selected rather narrow power range. For example, a torch designed to operate at relatively low power, e.g. 30 to 50 KW, to heat a small kiln in a laboratory cannot be operated at higher power levels, e.g. 120 to 130 KW, to heat a scaled-up version of the kiln in a pilot plant. Neither will a torch designed to operate at a high power level work efficiently at low power. Therefore, a particular installation may be required to stock several different torches in order to satisfy all of its heating requirements.

Also, some conventional torches are not particularly efficient even within their designed operating range. The efficiency of a torch is measured by the power delivered to the plasma with relation to the amount of power supplied to the torch, the difference being electrode and radiation losses reflected as heating of the cooling water supplied to the torch. It is not uncommon for some conventional torches to operate at an efficiency as low as 50% so that the cost of using those torches is quite high. Also, in many present day electric arc torches, fairly rapid deterioration of the torch parts, particularly their electrodes, occurs over time because their arcs become unstable and tend to wander causing overheating, erosion and pitting of those parts as noted above. Such damage to the electrodes further destabilizes the arc resulting in more erosion and damage to the torch parts. Accordingly, those torches suffer from excessive parts losses and downtime for repair and maintenance.

SUMMARY OF THE INVENTION

Accordingly, it is an object of the present invention to provide a plasma jet torch or heater which will work effectively over an unusually wide range of operating conditions.

Another object of the invention is to provide a plasma jet torch which will operate efficiently over a wide range of power levels.

A further object of the invention is to provide a torch of this type whose components including the electrodes have a relatively long life expectancy.

Still another object of the invention is to provide a plasma jet torch which delivers a maximum amount of heat energy to the plasma for a given amount of input power.

Another object of the invention is to provide an electric arc torch design which permits the torch to be used in diverse applications having different heating requirements.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Briefly, my improved electric arc torch comprises an insulating housing which supports a cathode section and an anode section which together define an arc passageway which extends from within the housing to one end thereof. The cathode and anode structures and the housing define water jackets so that cooling water can be circulated through the torch and brought redundantly into intimate heat exchange contact with those electrodes in order to prevent those parts from overheating when the torch is in operation. The cathode is a well-type cathode with the electron emitting component of the cathode being located at the bottom of the well. However, instead of being flush with the bottom of the well as disclosed, for example, in the aforementioned U.S. Pat. No. 3,297,899, that cathode element projects appreciably from the bottom of the well toward the anode section to form a pointed promontory centered on the axis of the arc passageway.

The anode section of the torch comprises an elongated nozzle-type primary anode. The entrance end of the anode bores located opposite the mouth of the well has a diameter which is the same as or slightly less than that of the well. The bore converges or tapers continuously from its entrance end to a sharp-edged exit orifice which leads into the bore of a secondary anode. The latter bore has a diameter appreciably larger than that of the exit end of the primary anode so that it constitutes a plenum and forms a relatively wide annular shoulder where the two anodes join. The secondary anode bore is uniform along its length and extends from the primary anode to the end of the torch housing where it is beveled to form the exit end of the arc passageway.

The cathode and anode sections are insulated from each other and are connected to a suitable source of DC power so that a voltage can be applied between the cathode and anode sections. When the torch is operating in a non-transferral mode, an arc emanates from the cathode structure projecting from the bottom of the well and propagates along the passageway to the beveled edge of the secondary anode at the end of the passageway. A plasma-forming working gas such as nitrogen is introduced tangentially into the arc passageway between the cathode and anode sections of the torch so that it forms a swirl or vortex in that passageway. A part of this gas swirl is deflected into the cathode well so that it stabilizes the segment of the arc in the well. The remainder of the working gas supplied to the torch flows as a swirl along the arc passageway through the primary and secondary anodes where it is heated by the arc to a high enough temperature to cause the gas to ionize and disassociate to form a high temperature plasma. Plasma effluent is projected from the mouth of the passageway at the end of the torch so that it can heat the surrounding atmosphere or a workpiece placed at that location. The working gas flowing through the arc passageway also cools the walls of the anode structures and helps to lengthen and stabilize the arc as is well known in the art.

In the present torch, however, the working gas is introduced under pressure into the arc passageway through an unusually large number of relatively large, uniformly distributed injection holes or passages so that an unusually uniform vortex flow is initiated in the arc passageway and so that the pressure drop across the injection holes is only a few psi. In addition, the projecting pointed cathode structure at the bottom of the well tends to fix the site for the emission of the electrons comprising the arc. Resultantly, the arc does not wander on that structure giving rise to temperature fluctuations that tend to damage the structure. Furthermore, the arc and plasma are so stable within the cathode well that there are essentially no pressure reflections to the gas injection holes that are sufficiently strong to cause variations or pulsing of the incoming gas flow. Consequently, the working gas and plasma moves along the primary anode of the torch as a very uniform vortex or swirl surrounding the arc. However, there is a gradual increase in the velocity or intensity of the vortex due to the taper of the anode bore until the gas exits the primary anode through its sharp-edged exit orifice and expands suddenly into the plenum chamber formed by the much larger diameter secondary anode.

With this arrangement, the torch will produce a stable arc which will extend from the cathode emitting structure all the way to the exit end of the secondary anode. Being of maximum length and being constricted by and exposed to high pressure working gas in the tapered primary anode, the voltage drop along the arc is a maximum. More importantly, the current supplied to the torch can be varied over a very wide range with appropriate changes in the gas flow without destabilizing the arc or shortening its length as a result of its arcing prematurely to the walls of the anode structures. Resultantly, the realized power of the torch, which is the product of the current and the arc voltage drop, can be varied over a very wide range to suit different heating requirements. Actually, the power to the plasma is that realized power less electrode and radiation losses which appear as heating of the cooling water supplied to the torch. As will be described in more detail later, the torch is designed to minimize these losses. Indeed, torches made in accordance with this invention have operated at 10 KW all the way to 180 KW. This was achieved at currents ranging from 20 amps to 400 amps or more and with the working gas flow to the torch varying from as low as 150 SCFH to as high as 2300 SCFH. This represents an operating current range of over 15:1 and a gas flow rate range of over 15:1 to be contrasted with conventional electric arc torches whose comparable ranges are only on the order of 5:1 and 4:1 respectively. As a result, the heat output from the present torch, measured as enthalpy, can be varied from as low as 500 BTU/lb. to as high as 9,000 BTU/lb. without any change whatsoever in the torch structure. Furthermore, the torch is 70% to 85% efficient over its entire operating range, as compared with prior torches which operate at efficiencies closer to 60%.

Finally, since the arc produced by the torch remains quite stable over the entire operating range of the torch and the current drawn by its electrodes remains quite low, those electrodes, which are also effieicntly cooled as noted above, have an operating life which is quite long as compared with the comparable components in present day torches. Indeed, the electrodes have actually been tested as long as 100 hours without failure and an electrode life as long as 300 to 400 hours can be expected. With all of the aforesaid advantages, the torch is still relatively easy to make and to assemble, being made primarily of machined parts which fit together into a single compact unit. Accordingly, it should find wide application wherever it is necessary to deliver intense heat to workpieces or to processes.

BRIEF DESCRIPTION OF THE DRAWINGS

For a fuller understanding of the nature and objects of the invention, reference should be had to the following detailed description, taken in connection with the accompanying drawings, in which:

FIGS. 4 to 7 are test tabulations and corresponding graphs illustrating torch operating parameters as discussed below.

DETAILED DESCRIPTION OF THE PREFERRED EMBODIMENT

Figure 1:
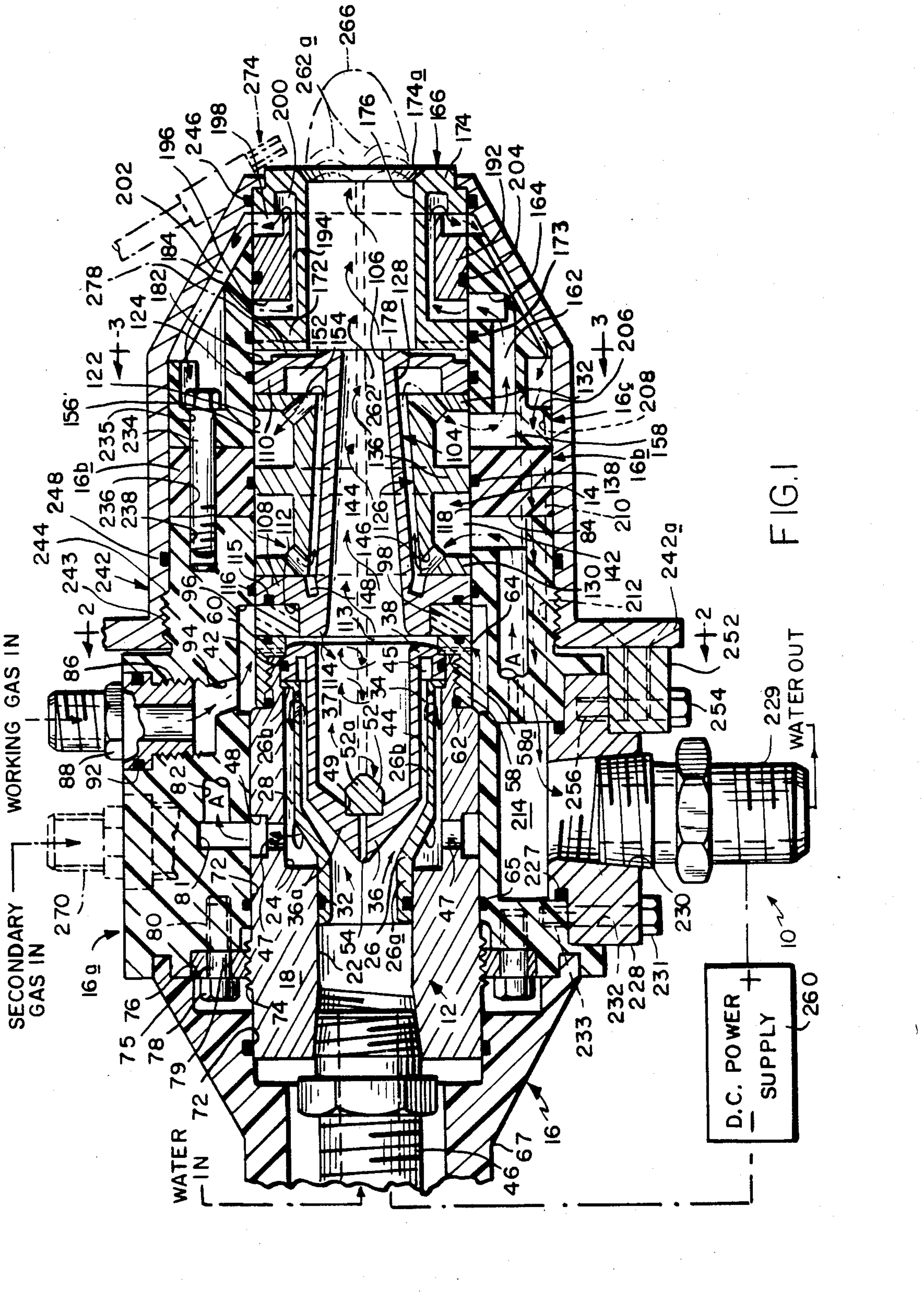
FIG. 1 is a sectional view of a plasma jet torch embodying the principles of this invention.
Figure 2:
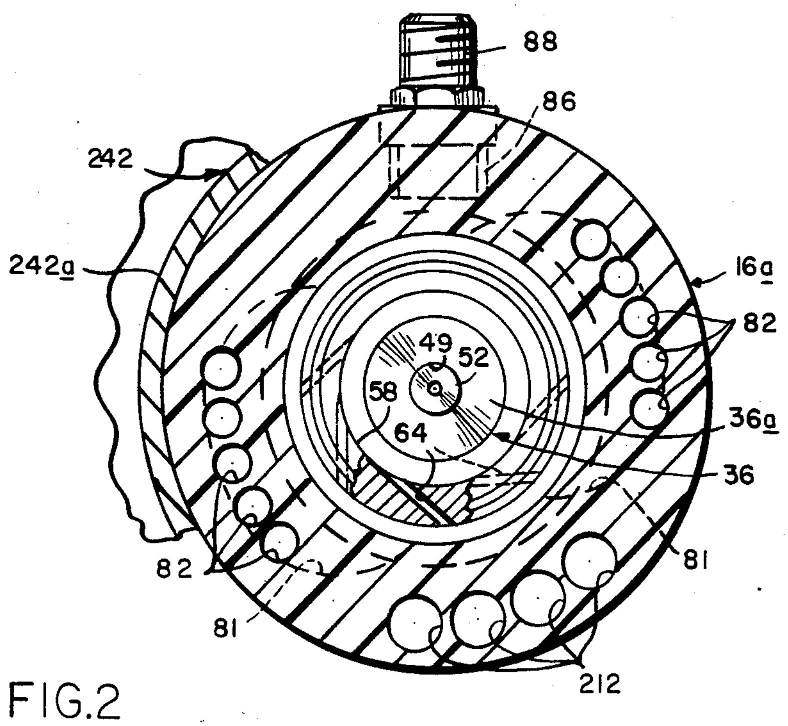
FIG. 2 is a sectional view along line 2—2 of FIG. 1.

Referring to FIGS. 1 and 2 of the drawings, my improved torch indicated generally at 10 comprises a cathode section shown generally at 12 and a collinear anode section indicated generally at 14 mounted in an insulating body or housing shown generally at 16 made of a suitably impact-resistant material such as Delrin resin. The cathode and anode sections as well as the housing are each composed of a plurality of annular components or parts which, when assembled, define passageways for supplying a gas to the torch to stabilize and lengthen the arc established between its electrodes and for circulating water through the torch to cool its various parts, particularly the electrodes.

The cathode section 12 includes a tabular cathode holder 18 made of a conductive metal such as brass. Holder 18 has an axial bore 22 whose front end is counterbored at 24 to accept a brass sleeve-like water separator 26. The outside diameter of the water separator is slightly smaller than the diameter of the counterbore 24 so that an annular passage or space 28 exists between the water separator and the wall of counterbore 24. The rear end of the separator is necked down at **26*a* and fits snugly within the cathode holder bore 22. That neck 26*a* is grooved circumferentially to accept an O-ring seal 32 which establishes a fluid-tight seal between the rear end of the water separator and the wall of bore 22. The front end of the water separator has a radial flange 26*b* which seats in a radial enlargement of counterbore 24*a* at the entrance to the counterbore. Also, a multiplicity, e.g. twenty, of rearwardly directed holes 34 are spaced around the separator wall adjacent its flange 26*b***.

A cathode 36 seats inside separator 26. The cathode is a cup-like member made of a heat resistant conductive metal such as a tellurium-copper alloy and defines a well 37 at the longitudinal centerline of the torch. Typically, the well is on the order of 0.875 inch in diameter and has a depth which may vary depending upon the operating voltage of the torch. Usually, the well depth ranges from 0.375 inch to 1.38 inches. The open front end of cathode 36 has a radial flange 38 which is sized to seat in the counterbore enlargement **24*a*, an O-ring seal 42 being provided in the edge of the flange to form an annular seal at that location. The outside diameter of cathode 36 is somewhat smaller than the inside diameter of the water separator 26 thereby leaving an annular passageway 44 between the separator and the cathode. Also, an annular slot 45 extends into the cathode flange from the rear as shown in FIG. 1 so that, when the cathode is seated in its holder 18, that groove forms an end wall for the annular passageway 44. Thus, when cooling-water is delivered to the bore 22 of the cathode holder through a fitting 46 connected to the rear end of the holder, it is conducted along passage 44 and is redirected through holes 34 back along passage 28 so that the cooling water makes two passes by the cathode thereby efficiently cooling that member. The water is conducted out of passage 28 by an array of holes 47 in the cathode holder wall to a circumferential groove 48** in the outside surface of the holder.

The left-hand end wall **36*a* of cathode 36 is more or less conical and projects into the necked-down portion 26*a* of the water separator 26. The inside surface of that end wall has a recess 49 for seating a cathode emitter 52 which extends out appreciably, e.g. about 0.34 inch, from the cathode end wall 36*a* at the centerline of the well 37. That member is made of a suitable heat-resistant conductive material such as a tungsten alloy and preferably it has a beveled or pointed end 52*a*. The emitter is retained within the recess 48 by an appropriate bonding agent such as solder, a weep hole 54** being provided at the bottom of the recess to drain away excess solder when the electrode is seated.

Completing the cathode section 12 is an annular gas injector or swirl ring 58 made of a metal such as tellurium-copper alloy which is engaged to the front end of the cathode holder 18. The gas injector is basically an internally threaded ring which screws onto a reduced diameter, exteriorly threaded end segment of the cathode holder, the joint between those two members being sealed by an O-ring 62. The gas injector has a radially inwardly extending flange **58*a* which overhangs the adjacent end of cathode 36 so that, when the gas injector is turned down onto the cathode holder as shown in FIG. 1, it retains the water separator 26 and the cathode 36 inside the cathode holder 18. Preferably the flanged end of the gas injector is grooved to seat an O-ring 60 to provide a seal between the gas injector and the torch's anode section 14. As best seen in FIG. 2, the gas injector includes a multiplicity, e.g. twenty to thirty, of unusually large, e.g. 1/16 inch, holes 64 spaced uniformly around its flanged end. These holes or passages extend from the outer surface of flange 58*a*** to the inner surface thereof and they are angled so that they intercept the axial hole through the flange tangentially.

As stated previously, the cathode section 12 is retained within the insulating housing 16. Actually housing 16 is composed of three different sections, namely a rear section **16*a*, a middle section 16*b* and a front section 16*c*, the cathode section being snugly received in an axial bore 72 in the rear housing section 16*a*. The cathode holder 18 is exteriorly threaded adjacent its rear end at 74 to receive an internally threaded retainer ring 75. Ring 75 seats in an annular groove 76 formed in the rear end wall of housing section 16*a*. Ring 76 and thus the entire cathode section 12 are anchored to that housing section by threaded fasteners 78 which extend through holes 79 spaced around ring 76 and screwed into threaded holes 80 in the housing section end wall. An O-ring 65 is seated in the wall of bore 72 adjacent its rear end to provide a seal there between the housing section and the cathode holder. Also, an insulating plastic cap or cover 67 engages over the rear end of the cathode holder 18 and the water fitting 46 which protrude from the rear end of the housing section 16*a***.

As best seen in FIGS. 1 and 2, when the cathode holder 18 is seated properly in bore 72, its circumferential groove 48 is located directly opposite a pair of arcuate slots 81 in the wall of bore 72 at opposite sides of the housing section **16*a*. Those slots intercept the left-hand ends of two groups of longitudinal passages 82, there being, say, five such passages in each such group so that cooling water from the holes 47 in the cathode holder can flow into those passages. Passages 82 extend to the front end of housing section 16***a* where they intercept a pair of arcuate notches 84 thereat which are aligned with the slots 81. That housing section end abuts the rear end of the middle housing section 16*b* which thus forms a wall for those notches so that they resemble the slots 81. For ease of illustration in FIG. 1, we have shown one slot 81 and the left-hand segment of a passage 82 near the top of housing section 16*a* and the right-hand segment of a passage 82 and a notch 84 near the bottom of that housing section, the continuity of those passages being indicated by the short arrows A.

Still referring to FIGS. 1 and 2, a vertical counterbored passage 86 is present in the top wall of housing section 16*a*, the passage being internally threaded to receive a threaded gas fitting 88. An O-ring 92 is seated in a circumferential groove in the gas fitting to provide a fluid-tight seal between that fitting and the passage wall. Fitting 88 is adapted to be connected to a source of a suitable plasma-forming working gas such as nitrogen, helium, argon or the like. A smaller passage 94 extends from the bottom of passage 86 to a relatively wide groove 96 inscribed in the wall of the housing section bore 72. When the cathode section 12 is seated in the housing section 16*a* as shown in FIG. 1, it forms with groove 96 an annular passage which extends all around the gas injector 58. Thus the working gas supplied to the torch through fitting 88 is conducted uniformly to all of the holes 64 in the gas injector.

The cathode section 12 is separated from the anode section 14 by an electrically insulating ring 98 made of ceramic or other comparable heat-resistant material which butts against the gas injector 58 in the bore 72 of housing section 16*a*. In this, it helps to define the annular passage surrounding the gas injector 58. The O-ring seal 66 at the end of the gas injector engages ring 98 to provide a fluid-tight seal between those two members.

Anode section 14 comprises an elongated primary anode 104 made of a heat-resistant metal such as a tellurium-copper alloy. Anode 104 is a tubular member having a frustoconical or tapered passage or bore 106 which is coaxial with the cathode well 37. Typically, the bore has a length of about 2.68 inches and 2° to 4° taper with the front or exit end of the bore being from 0.325 to 0.425 inch in diameter, 0.375 inch being the optimum size. The anode is terminated by a pair of circular flanges 108 and 110 whose diameters are slightly less than that of bore 72 in housing section 16*a* permitting the left-hand end segment of the anode 104 to be slid into bore 72. Flange 108 is notched at 112 to provide only enough clearance for the spacer ring 98 so that the rear end of the anode is spaced slightly from the forward end of cathode 36. This provides an annular gap 113 between the cathode and the primary anode 104 through which the working gas issuing from the holes 64 in the injector 58 may pass into the well 37 and the anode bore 106. Preferably, the rear end of bore 106 has a somewhat smaller diameter than well 37 so that an annular shoulder 114 is disposed opposite the mouth of the well for reasons that will be described later.

A wall of the anode notch 112 is grooved to accept an O-ring 115 to provide a fluid-tight seal between that wall and the spacer ring 98. Another O-ring 116 is seated in a groove in the bore 72 wall opposite flange 108 to provide a fluid-tight seal at that location. The primary anode 104 projects from the forward end of housing section 16*a* through the bore 118 of housing section 16*b* into the bore 122 of housing section 16*c*, those two bores having the same diameter as bore 72 so that the anode flange 110 is received snugly in the forward housing section bore 122. An O-ring 124 is seated in a groove in the wall of bore 122 opposite the edge of flange 110 to provide a fluid-tight seal between that flange and the housing section 16*c*.

Surrounding the primary anode 104 between its flanges is a tubular water separator 126. The separator has a central frustoconical stem 128 terminated by radial flanges 130 and 132. Flange 130 at the rear end of the separator seats against flange 108 of the primary anode and extends out to snugly engage the wall of bore 72 in housing section 16*a*. The opposite flange 132 engages against the primary anode flange 110 and extends out to the wall of bore 122 in housing section 16*c*. A third flange 136 extends out radially from stem 128 to engage the wall of bore 118 in housing section 16*b*. That last wall is grooved to receive an O-ring 138 for providing a fluid-tight seal between section 16*b* and flange 136. Preferably, the water separator 126 is split lengthwise into two mirror-image halves so that it can be engaged around the primary anode before that anode is received into the bores of housing sections 16*a* to 16*c*.

As shown in FIG. 1, when the primary anode and its water separator are seated inside the housing sections, the separator flanges 130 and 136 along with the housing section bore walls 72 and 118 define an annular space 142, sectors of which lie opposite the notches 84 in the housing section 16*a* which communicate with passages 82. The inner diameter of the water separator 126 is slightly larger than the outer diameter of the primary anode stem 106 so that an annular passage 144 exists between the water separator and the anode stem. Also, a circular array of holes 146 is formed through the wall of separator 126, the holes leading from space 142 to passage 144. These holes are angled rearwardly as shown in FIG. 1. Further, an annular groove 148 is inscribed in the forward face of the anode flange 108 which opens to the holes 146 as well as to passage 144 and it is oriented to provide smooth fluid flow between those openings.

Figure 3:
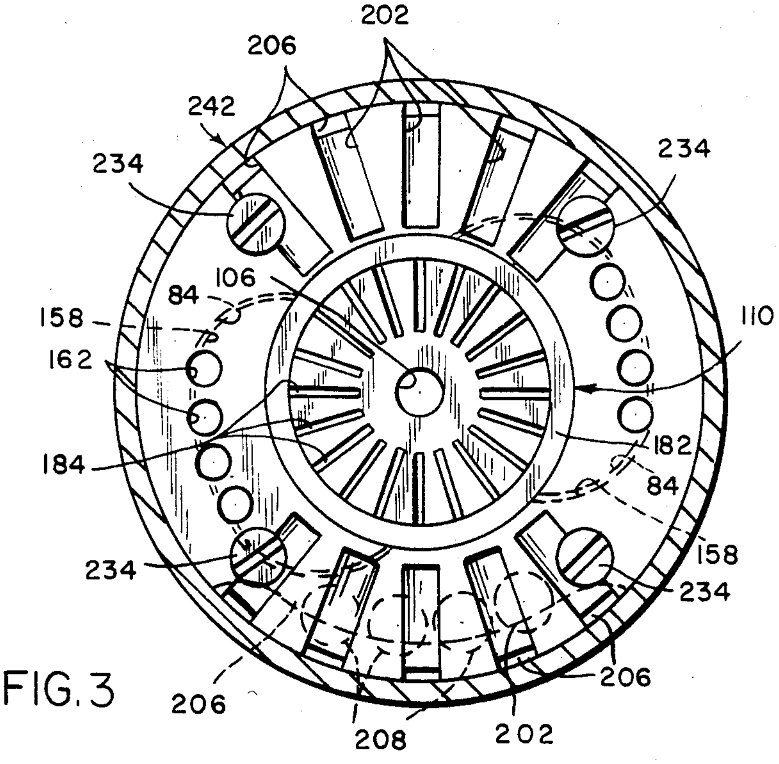
FIG. 3 is a sectional view along line 3—3 of FIG. 1.
Figure 5:
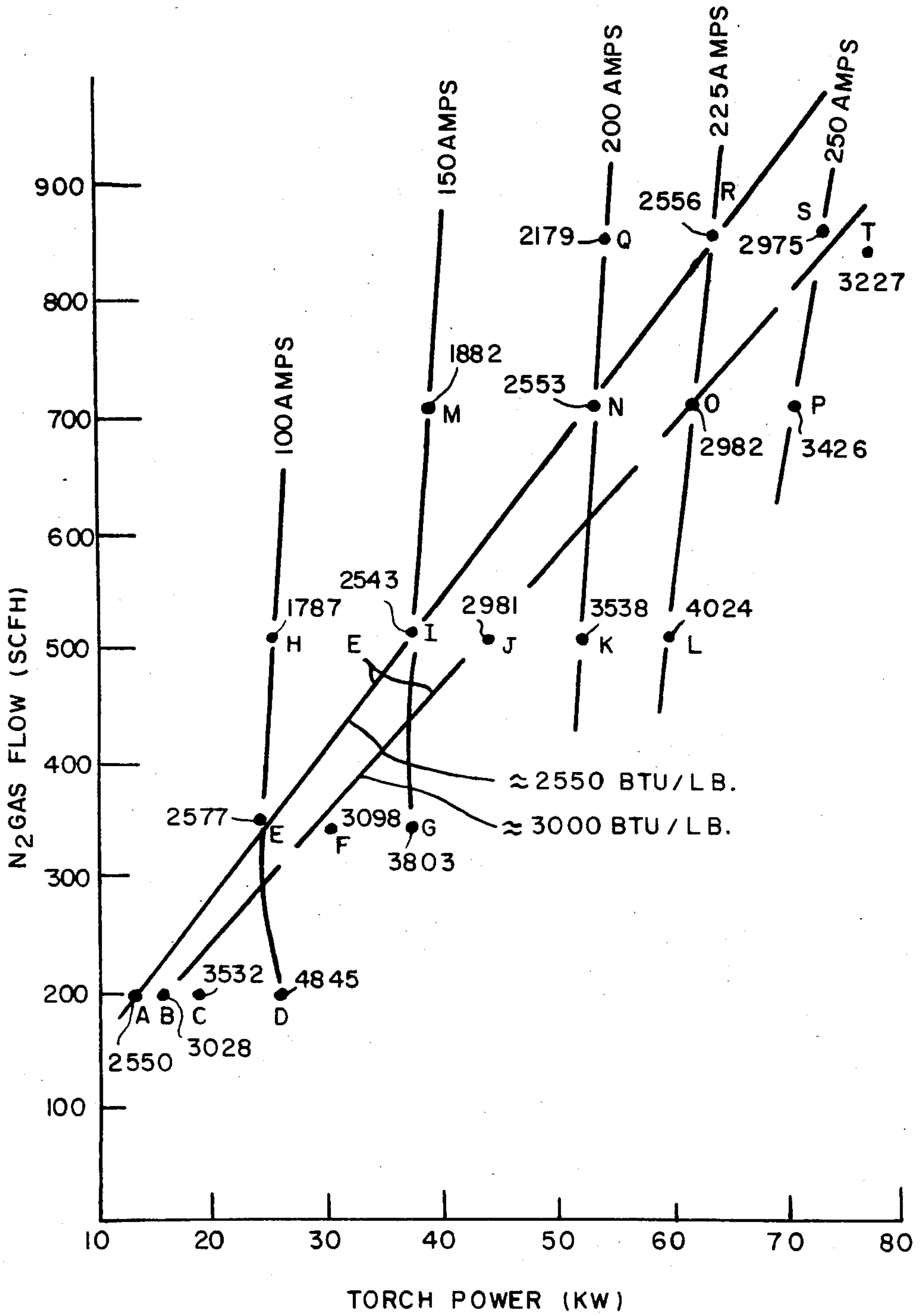
Figure 7:
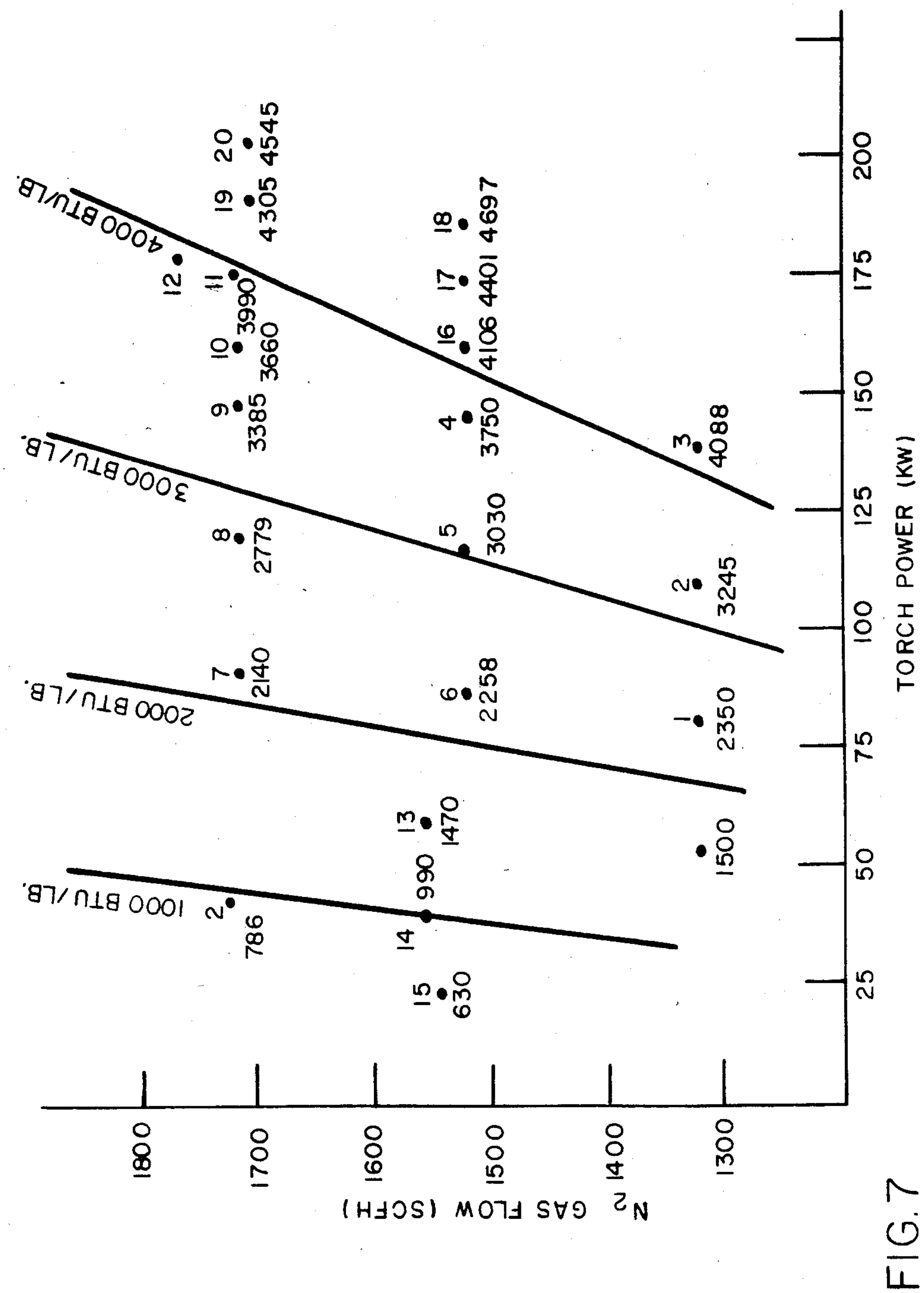

The primary anode flange 110 also has an annular groove 152 that is positioned opposite the forward end of passage 144. A circular array of rearwardly directed holes 154 extends through the wall of the water separator from groove 152 to an annular space 156 located between the separator flanges 132 and 136. As best seen in FIGS. 1 and 3, the space 146 opens to a pair of diametrically opposite arcuate notches 158 in the rear end wall of housing section 16*c*. The notches 158, which are similar to the notches 84 in housing section 16*a* in that they are also bounded by housing section 16*b*, intercept the ends of two groups of five passages 162 extending lengthwise through the wall of housing section 16*c*. These passages lead to a pair of diametrically opposite grooves 164 inscribed in the wall of the housing section bore 122, only one of which is shown in FIG. 1. These grooves are similar to grooves 84 described above.

Thus the cooling water from passages 82 is conducted into the annular space 142 and circulated through holes 146 into the annular passage 144 surrounding the primary anode. Then it is routed back through holes 154 to the annular space 156 before it is conducted via the notches 158 to passages 162. Thus, the primary anode 104 is also effectively jacketed by two layers of cooling water.

Still referring to FIG. 1, positioned forwardly of the primary anode 104 is a cylindrical secondary anode 166 made of the same material as the primary anode. Its rear end has a radial flange 172 which seats against the front end of the primary anode 104 making good electrical contact therewith and it also fits snugly within the bore 122 of housing section 16*c*. An O-ring 173 is recessed into bore 122 opposite the flange edge to provide a seal between that flange and the housing section 16*c*. The secondary anode projects out from the front of the housing section 16*c* and its front end carries a radial flange 174 whose inner edge is beveled at 174*a*. The axial passage 176 through anode 166 has a diameter which is appreciably larger than the diameter of the front end of passage 106 through the primary anode 104. Preferably, anode 166 has a length of about 1.65 inches and a diameter of from 0.5 inch to 1.125 inches with 0.876 inch being an optimum size. This creates a wide annular shelf 178 at the front face of the primary anode 104 which extends between the inner wall of the secondary anode and the circular knife edge at the end of anode passage 106. By "knife edge", I mean an edge with no radius formed by intersecting surfaces making an angle of at least 270° and which is uniformly sharp around its circumference as shown in FIGS. 1 and 3. As shown in FIG. 3, the front face of the primary anode flange 110 has a peripheral notch 182 to provide an annular space between that flange and the secondary anode flange 172. Furthermore, a circular array of radial slots 184 are inscribed in the front face of flange 110 which extend from notch 182 to locations on shelf 178 opposite the secondary anode passage 176.

Referring to FIG. 1, surrounding the secondary anode 166 is a water separator 192 formed as a split sleeve which fits snugly between the secondary anode flanges 172 and 174. Its inner diameter is slightly larger than the outer diameter of the central portion of that anode, leaving an annular passage 194 between the water separator and the anode. A circular array of radial notches 196 is formed in the rear end wall of the water separator. These notches are located directly opposite the grooves 164 formed in the bore 122 of the housing section 16*c* so that cooling water can flow from those grooves through the notches into the annular passage 194.

The opposite or front end of the water separator is also provided with a circular array of radial notches 198 which extend from the outer wall almost to the inner wall of that member. Further, a circular groove 200 is inscribed in the rear face of the secondary anode flange 174 so that the water can flow from passage 194 via that groove radially out through notches 198 to the front ends of a circular array of longitudinal slots 202 formed in the beveled front end porton of housing section 16*c*. An O-ring 204 is seated in a circumferential groove in water separator 192 to provide a seal between the water separator and the housing section 16*c*. The rear ends of slots 202 communicate with an arcuate groove 206 extending around the perimeter of housing section 16*c*. As shown in FIG. 3, a group of four large passages 208 extend lengthwise through the wall of section 16*c* from groove 206 to the rear end of section where they register with similar lengthwise passages 210 extending through the wall of housing section 16*b* and with a like number of passages 212 extending through the wall of housing section 16*a* which lead to a recess 214 in the underside of housing section 16*a* to which the cooling water from slots 202 is conducted. The mouth of recess 214 in housing section 16*a* is closed by a conductive metal plug 228 which functions both as an anode conductor and a connector for a cooling water outlet fitting 229 which is screwed into a threaded hole 230 in that plug. An O-ring 227 is seated in a circumferential groove in the plug to provide a seal between the plug and the wall of recess 214 and the plug is held in place by threaded fasteners 231 which extend through passages 232 in the plug and are turned down into threaded holes 233 at the underside of housing section 16*a*.

As shown in FIGS. 1 and 3, the three housing sections are secured together by four bolts 234 which extend rearwardly through countersunk holes 235 in housing section 16*c* and through registering holes 236 in section 16*b* and are turned down into threaded holes 238 in the front end of housing section 16*a*.

A conductive metal shell 242 is engaged over the front end of the torch. The leading end of the shell interfits with and retains the front end of anode 166 which projects from housing section 16*c*. The shell extends back around housing sections 16*c* forming a cover for the cooling water slots 202. It also encircles section 16*b* and a portion of section 16*a*. The shell is interiorly threaded at 243 adjacent its rear end so that it can be screwed onto an exteriorly threaded segment 244 of housing section 16*a*. An O-ring 246 is provided at the boundary between the secondary anode flange 174 and the shell to provide a seal at that location. Another O-ring 248 provides a seal between the housing section 16*c* and the shell where the shell is threaded onto that member. As shown in FIG. 1, the shell has a radial flange 242*a* at its rear end which carries a conductive lug 252 which is anchored to plug 228 by one or more bolts 254 each of which extends through the lug into a threaded hole 256 in the plug. Thus there is a good electrical connection between the secondary anode 166 and fitting 229.

Cooling water is supplied to torch 10 by way of fitting 46 and flows through the torch along the circuitous path indicated by the dot-dash arrows in FIG. 1, leaving through fitting 229. In so doing, it is brought into very intimate heat exchange contact with all of the torch's electrode structures that are subjected to the hot plasma produced when the torch is in operation. Consequently, those parts do not suffer heat damage despite the high temperatures developed by the torch.

The torch is connected electrically by way of its fittings 46 and 229 to an appropriate DC power supply 260. Electrons flow from the power supply to cathode 36 via holder 18 and the gas injector 58 and emerge from its emitter 52 to form an arc column indicated generally at 262. The arc column extends axially along the pathway formed by well 37 and the anode passages 106 and 176 and, in this nontransferred mode of operation, the arc fingers 262*a* impinge against the beveled surface 174*a* of the secondary anode 166 at the leading end of the torch. The return path for the electrons is along the conductive shell 242 to lug 252 and plug 228 to the positive terminal of power supply 260. The arc is typically initiated by momentarily supplementing the DC voltage with a high frequency alternating voltage.

The working gas for torch 10 is supplied via fitting 88 which is connected to a suitable source of such gas. As noted previously, the working gas may be nitrogen, argon or other gas depending upon the particular application. The gas flows via passage 94 to the annular groove 96 in housing section 16*a* which surrounds the gas injector 58. The gas issues from the holes 64 in the injector so that it enters the gap 113 between the cathode 36 and primary anode 104 as a swirl or vortex as indicated by the solid line arrows in FIG. 1.

The main body of the vortex flow enters the primary anode bore 106 and becomes heated and disassociated by the arc stream forming a plasma which travels along the bore 176 in the secondary electrode 166 emerging from the front of the torch as a plasma effluent shown generally at 266 in FIG. 1. Due to the presence of the annular shoulder 114 at the mouth of well 37, a small portion of the incoming gas swirl is deflected into the well and is recirculated there. This "dead" gas vortex still helps to stabilize the segment of the arc within well 37.

In some applications, it it desirable to expose the workpiece being heated to a certain atmosphere to obtain a particular reaction. For example, it may be desired to heat the workpiece in the presence of an oxidizing or reducing atmosphere. This is usually accomplished by introducing a gas, oxygen, for example, into the plasma stream issuing from the mouth of the torch. Provision is made in the illustrated torch 10 for connecting a second gas fitting shown generally at 270 in FIG. 1 so that a secondary gas supplied to that fitting is conducted through longitudinal passages (not shown) in the wall of housing 16 to the annular space provided by the notch 182 at the front end of the primary anode. The secondary gas then flows through the radial notches 184 at the front of that anode and is released at the shelf 178 into the plasma stream passing through the secondary anode bore 176. The secondary gas comingles with and is heated by the hot plasma thus forming part of the effluent 266 issuing from the torch to the workpiece. Also, in some instances, it may be desirable to introduce particulate matter such as metallic powder in the effluent so that the powder will be melted before being deposited at the workpiece. In the present torch, a set of nozzles for dispensing such particulate material can be mounted at the mouth or exit end of the torch so as to eject such material into the plasma effluent. One such nozzle is indicated in dotted lines at 274 in FIG. 1.

During the operation of the plasma jet torch described above, the origin of the electron stream emitted from the cathode structure 52 projecting out from the bottom well 37 is stably positioned on the emitting structure 52. Accordingly, the surface of that structure suffers a minimum amount of erosion and damage due to temperature cycling. Also, the introduction of the pressurized working gas into the arc pathway through a large number of uniformly distributed large injection holes reduces the pressure drop of the gas as it enters the pathway so that there are essentially no fluctuations in the incoming gas flow due to any minute pressure fluctuations that might be caused by minute movements of the arc segment in well 37. As a result, a strong very uniform gas swirl surrounds the arc along substantially its entire extent within the arc pathway. The velocity or intensity of this swirl increases progressively due to the continuous convergence of the primary anode bore 106 and tends to squeeze the arc and keep it centered on the axis of the arc pathway all the way to the exit end of the primary anode. Consequently, the striking of arc fingers from the main body of the arc to the wall of bore 106 does not occur.

Further, the issuance of the hot gas and plasma through the knife-edged orifice at the exit end of the primary anode into the space bounded by the much larger diameter secondary anode relatively remote from the arc pathway inhibits the tendency for arc fingers to strike to the wall of the secondary anode bore 176. Resultantly, the arc 262 propagates all the way out to the very end of the secondary anode before striking over to that anode edge **174*a* as arc fingers 262*a* except when operating at high currents in which case some of the arc strikes in the bore of the secondary anode 176. These factors maximize the arc voltage drop. These same factors along with the above described very efficient redundant electrode cooling arrangement in torch 10** maximizes the current that can be drawn by the torch without damage to its electrodes and other parts. As a result, a maximum amount of power can be delivered to the arc.

Further, because the gas stream is introduced into the arc pathway as an intense uniform swirl which progressively increases in intensity and constricts as described above, there is very intimate contact between the gas and the arc stream 262 with the result that there is a very efficient transfer of energy to the plasma so that the heat output from the torch is a maximum for a given amount of input power. Yet the present torch will still operate very effectively at lower power levels and gas flow rates. In actual tests, the present torch has been operated at current levels ranging from 20 amps to 500 amps at various gas flow rates varying from 150 to 2300 SCFH without failure at efficiencies ranging from 72% to as high as 85% while yielding enthalpies extending from as low as 500 BTU/lb. to as high as 7,000 BTU/lb. FIGS. 4 to 7 are tables and corresponding graphs illustrating the results of some of these tests showing enthalpies achieved at different torch power levels and working gas flow rates. It is important to note that, as clearly shown by the constant enthalpy lines E in the graphs, the same heat output can be obtained with widely varying power and working gas flow rate levels. Accordingly, the same torch can be used in situations where there are different constraints on those factors.

Further, we have found that, by electrically isolating the primary and secondary electrodes of torch 10 by placing an insulator made of a temperature-resistant material such as boron nitride between the primary and secondary anodes as indicated in dotted lines at 278 in FIG. 1, the torch can draw up to 50% more current without the arc striking to the wall of the primary anode. As can be appreciated, this drastically increases the output power of the torch enabling it to achieve enthalpies of more than 18,000 BTU/lb.

In addition to the cost savings resulting from the efficient operation of torch 10, the torch is composed of parts which are relatively easy to make. Further, as described above, they can be pieced together quite quickly by the average production worker. Consequently, the overall cost of making and assembling the torch can be held to a minimum. Considering also that the present torch should reduce the need for stocking different torches for handling applications requiring different torch powers, a considerable overall cost savings results through the acquisition and use of this torch.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. A plasma jet torch comprising a cathode well including a mouth, a first elongated nozzle-type anode spaced collinlearly from the mouth of the well, said first anode having an axial bore which converges uniformly from its entrance end adjacent the cathode well to its exit end, a second nozzle-type anode positioned collinearly to the first anode at said said exit end thereof remote from the cathode well, said second anode having a bore which is appreciably larger than the exit end of the first anode bore so that there is a sharp knife edge transition between the two bores, said cathode well and anodes forming an arc passageway having a longitudinal axis, a cathode emitter structure projecting from the bottom of said well along said axis, means for introducing a strong swirl of working gas into the arc passageway at a location between the cathode well and first anode, the general plane of which swirl is perpendicular to the axis of the arc passageway, and means for applying a direct current voltage between said cathode emitter structure and said second anode so that said torch can operate in a nontransferred arc mode.

2. The torch defined in claim 1 wherein said cathode emitter structure has a beveled free end.

3. The torch defined in claim 1 wherein said introducing means comprise a multiplicity of relatively large gas injection orifices spaced uniformly around said arc passageway and which intercept said passageway tangentially.

4. The torch defined in claim 1 wherein the first and second anodes make electrical contact with one another.

5. The torch defined in claim 1 wherein the first and second anodes are electrically insulated from one another.

6. The torch defined in claim 1 and further including means for introducing a secondary gas into said arc passageway downstream from said working-gas-introducing means.

7. A plasma jet torch comprising a cathode well including a mouth, a first nozzle-type anode spaced colinearly from the mouth of the well, said first anode having an axial bore which converges uniformly from its entrance end adjacent the cathode well to its opposite end, a second nozzle-type anode positioned collinearly to the first anode at said bore opposite end, said second anode having a bore which is appreciably larger in diameter than said opposite end of the first anode bore so that there is a sharp knife edge transition between the two bores, said cathode well and said anodes forming an arc passageway having a longitudinal axis, a cathode in said well centered substantially on said axis, means for introducing a strong swirl of working gas into the arc passageway at a location between the cathode well and first anode, the general plane of which swirl is perpendicular to the axis of the arc passageway.

8. The torch defined in claim 7 wherein the first and second anodes make electrical contact with one another.

9. The torch defined in claim 7 wherein the first and second anodes are electrically insulated from one another.

10. The torch defined in claim 7 wherein said second anode bore is on the order of twice as large as said first anode bore.

11. The torch defined in claim 7 wherein said convergiong first anode bore has a taper of about four degrees.

12. The torch defined in claim 7 and further including means for applying a direct current voltage between said cathode and said second anode.

* * * * *